US012749842B2

(12) United States Patent
Yoshida

(10) Patent No.: US 12,749,842 B2
(45) Date of Patent: Sep. 29, 2026

(54) CONNECTOR

(71) Applicant: SUMITOMO WIRING SYSTEMS, LTD., Mie (JP)

(72) Inventor: Yutaro Yoshida, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 368 days.

(21) Appl. No.: 18/596,159

(22) Filed: Mar. 5, 2024

(65) Prior Publication Data

US 2024/0313459 A1 Sep. 19, 2024

(30) Foreign Application Priority Data

Mar. 16, 2023 (JP) ................................ 2023-041800

(51) Int. Cl.
*H01R 13/436* (2006.01)

(52) U.S. Cl.
CPC ................................ *H01R 13/4364* (2013.01)

(58) Field of Classification Search
CPC .................................................. H01R 13/4364
USPC ...................................................... 439/733.1
See application file for complete search history.

(56) References Cited

U.S. PATENT DOCUMENTS 4,867,711 A * 9/1989 Yuasa ................ H01R 13/4362 439/744
5,252,096 A * 10/1993 Okada ................ H01R 13/4362 439/752
5,358,427 A * 10/1994 Miwa ................. H01R 13/4362 439/752
5,464,356 A * 11/1995 Nebeshima ........ H01R 13/4362 439/752
5,797,772 A * 8/1998 Sakurai .............. H01R 13/4362 439/752
6,010,374 A * 1/2000 Miwa ................. H01R 13/4362 439/752
6,902,443 B2 * 6/2005 Hara .................. H01R 13/4362 439/752
7,488,220 B2 * 2/2009 Suzuki ............... H01R 13/4362 439/752
9,231,348 B2 * 1/2016 Kanemura ......... H01R 13/4368
9,484,660 B2 * 11/2016 Shuey ................ H01R 13/4362
9,859,648 B2 * 1/2018 Hara .................... H01R 13/506
9,972,947 B2 * 5/2018 Sekino ............... H01R 13/7031
10,566,737 B2 * 2/2020 Ochiai ............. H01R 13/62955
10,622,746 B2 * 4/2020 Abraham ........... H01R 13/4362
10,714,860 B2 * 7/2020 Washio ............... B60R 16/0207
11,217,946 B2 * 1/2022 Nawa ................. H01R 13/7032
11,394,151 B2 * 7/2022 Sundarakrishnamachari ............. H01R 13/4226
2015/0079827 A1 3/2015 Hara
(Continued)

*Primary Examiner* — Harshad C Patel
(74) *Attorney, Agent, or Firm* — Venjuris, P.C.

(57) ABSTRACT

A connector that can appropriately exhibit a detection function of a retainer is provided. A retainer 12 is disposed so as to be moveable between a partially locked position and a fully locked position relative to a housing 11. A front member 13 moves in a direction that intersects a movement direction of the retainer 12 with respect to the housing 11, and is mounted to the housing 11. The front member 13 has an interference portion 61 configured to interfere with the retainer 12 at the partially locked position or an intermediate position along a path from the partially locked position to the fully locked position when the front member 13 moves toward the mounted position.

5 Claims, 13 Drawing Sheets

(56) References Cited

U.S. PATENT DOCUMENTS

| | | | | |
|---|---|---|---|---|
| 2015/0099404 A1* | 4/2015 | Lida | H01R 13/4361 439/752 |
| 2020/0227871 A1* | 7/2020 | Kobayashi | H01R 13/6272 |

* cited by examiner

CONNECTOR

CROSS-REFERENCE TO RELATED APPLICATIONS

This application is based on and claims priority from Japanese Patent Application No. 2023-041800, filed on Mar. 16, 2023, with the Japan Patent Office, the disclosure of which is incorporated herein in its entirety by reference.

TECHNICAL FIELD

The present disclosure relates to a connector.

BACKGROUND

The connector disclosed in JP 2015-060628 A includes a housing in which terminal fittings are housed, and a retainer disposed so as to be movable between a partially locked position and a fully locked position relative to the housing. When the retainer is at the partially locked position, a terminal fitting is inserted into and housed in a cavity of the housing from the rear. The terminal fitting is locked by the retainer that has moved to the fully locked position, and is restricted from dislodging rearward from the cavity. When the terminal fitting is in a semi-inserted state where it is not properly inserted into the cavity, the terminal fitting interferes with the retainer and the retainer cannot reach the fully locked position, and thus a portion of the retainer protrudes from the outer surface of the housing. If a portion of the retainer protrudes from the outer surface of the housing, the portion of the retainer will interfere with a partner connector, thus restricting a fitting operation. Utilizing the fact that the fitting operation of the partner connector is restricted, it is possible to detect (recognize) that the terminal fitting is semi-inserted, for example. A connector including such a retainer is also disclosed in JP 2015-072868 A.

SUMMARY

In the above, due to reductions in the size of connectors and the like, there are cases where, when the terminal fitting is semi-inserted, a portion of the retainer does not sufficiently protrude from the outer surface of the housing. Thus, despite the retainer having not reached the fully locked position, there is concern that a partner connector will be inadvertently fitted to the housing. Consequently, there is an issue where it cannot be recognized that the terminal fitting is semi-inserted, and the detection function of the retainer used to detect the insertion state of the terminal fitting is impaired.

Thus, an object of the present disclosure is to provide a connector that can appropriately exhibit the detection function of a retainer.

A connector including: a terminal fitting; a housing configured to house the terminal fitting; a retainer disposed so as to be moveable between a partially locked position and a fully locked position relative to the housing, and configured to lock the terminal fitting housed in the housing and restrict rearward dislodgement of the terminal fitting when at the fully locked position; and a front member configured to move in a direction that intersects a movement direction of the retainer with respect to the housing, and to position a front wall of the front member on a front surface side of the housing while disposed at a mounted position relative to the housing, wherein the front member has an interference portion configured to interfere with the retainer at the partially locked position or an intermediate position along a path from the partially locked position to the fully locked position when the front member moves toward the mounted position.

With the present disclosure, it is possible to provide a connector that can appropriately exhibit the detection function of a retainer.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
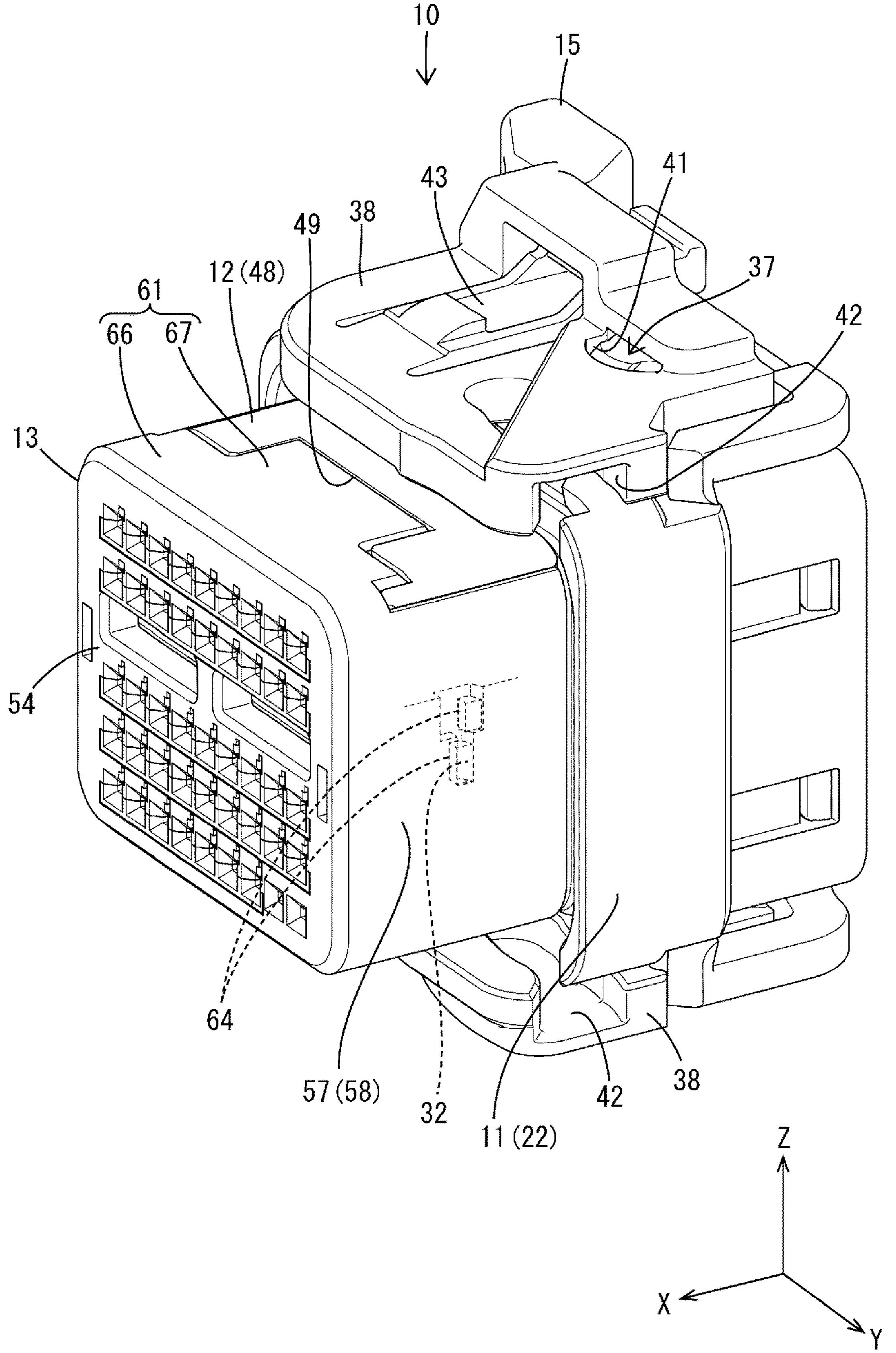
FIG. 1 is a perspective view of a connector according to Embodiment 1 of the present disclosure.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of the Present Disclosure

First, embodiments of the present disclosure will be listed and described.

(1) A connector according to the present disclosure includes: a terminal fitting; a housing configured to house the terminal fitting; a retainer disposed so as to be moveable between a partially locked position and a fully locked position relative to the housing, and configured to lock the terminal fitting housed in the housing and restrict rearward dislodgement of the terminal fitting when at the fully locked position; and a front member configured to move in a direction that intersects a movement direction of the retainer with respect to the housing, and to position a front wall of the front member on a front surface side of the housing while disposed at a mounted position relative to the housing, wherein the front member has an interference portion configured to interfere with the retainer at the partially locked position or an intermediate position along a path from the partially locked position to the fully locked position when the front member moves toward the mounted position.

When the interference portion interferes with the retainer at the partially locked position or the intermediate position, movement of the front member to the mounted position is stopped. Thus, using the fact that the front member cannot reach the mounted position, it is possible to detect that the retainer remains at the partially locked position or the intermediate position. By performing an operation to move the retainer to the fully locked position after detecting that the retainer remains at the partially locked position or the intermediate position, it is possible to again detect the insertion state of the terminal fitting. The interference portion of the front member can interfere with the retainer at the partially locked position or the intermediate position, and thus it is possible to reliably detect that the retainer remains at the partially locked position or the intermediate position.

(2) In the connector of (1), it is preferable that the housing has a mounting hole that is open in at least one surface of an outer surface of the housing, the retainer is disposed inside the mounting hole and locks the terminal fitting, and the interference portion protrudes rearward from the front wall and is disposed along the one surface, and the retainer has an interference-receiving surface that is configured to protrude from the one surface and interfere with the interference portion when the retainer is at the partially locked position or the intermediate position.

As a result of the interference portion disposed along the one surface of the housing interfering with the interference-receiving surface of the retainer protruding from the one surface of the housing, movement of the front member to the mounted position is stopped, and it is possible to detect that the retainer remains at the partially locked position or the intermediate position. Thus a state can be realized where the interference portion of the front member interferes with the interference-receiving surface, even if the protrusion amount of the retainer from the one surface of the housing is small.

(3) In the connector in (2), it is preferable that the interference-receiving surface is inclined forward as a leading end of the interference-receiving surface protrudes in a protruding direction from the one surface.

With the configuration of (3), when the retainer remains at the partially locked position or the intermediate position, the interference portion can firmly interfere with the interference-receiving surface, and thus movement of the front member to the mounted position can be reliably stopped. As a result, the front member can be used to detect that the retainer remains at the partially locked position or the intermediate position with greater probability.

(4) In the connector in (2) or (3), it is preferable that the retainer has side portions that respectively oppose side surfaces on both sides of the outer surface of the housing that intersect the one surface, the front member has side wall portions respectively disposed outside the side portions when the front member is at the mounted position, and an outer surface of the side portions or an inner surface of the side wall portions has a recess, and the other of the outer surface and the inner surface has a protrusion that fits into the recess when the retainer is at the fully locked position and that interferes with a portion other than the recess when the retainer is at the partially locked position or the intermediate position.

With the configuration of (4), as a result of the interference portion and the interference-receiving surface interfering with each other on the one surface side of the housing and the protrusions interfering with portions other than the recesses on the side surfaces of the housing when the retainer remains at the partially locked position or the intermediate position, movement of the front member to the mounted position is stopped. As a result, it is possible to detect that the retainer remains at the partially locked position or the intermediate position with even greater probability.

(5) The connector in any one of (2) to (4) may further include a lever pivotably supported by the housing, and an end portion of the retainer may be disposed so as to be exposed above the one surface and be covered by the lever at a position opposing the lever.

With this configuration, a state can be realized where the interference portion interferes with the interference-receiving surface, even if the protrusion amount of the interference-receiving surface from the one surface of the housing is small, and thus the opposing distance between end portions of the retainer and the lever can be reduced, which contributes to a reduction in the size of the connector.

Details of Embodiments of the Present Disclosure

Specific examples of the present disclosure will be described below with reference to the drawings. The present invention is not limited to these examples, but is indicated by the claims, and all changes that come within the meaning and range of equivalency of the claims are intended to be embraced therein.

Embodiment 1

Figure 2:
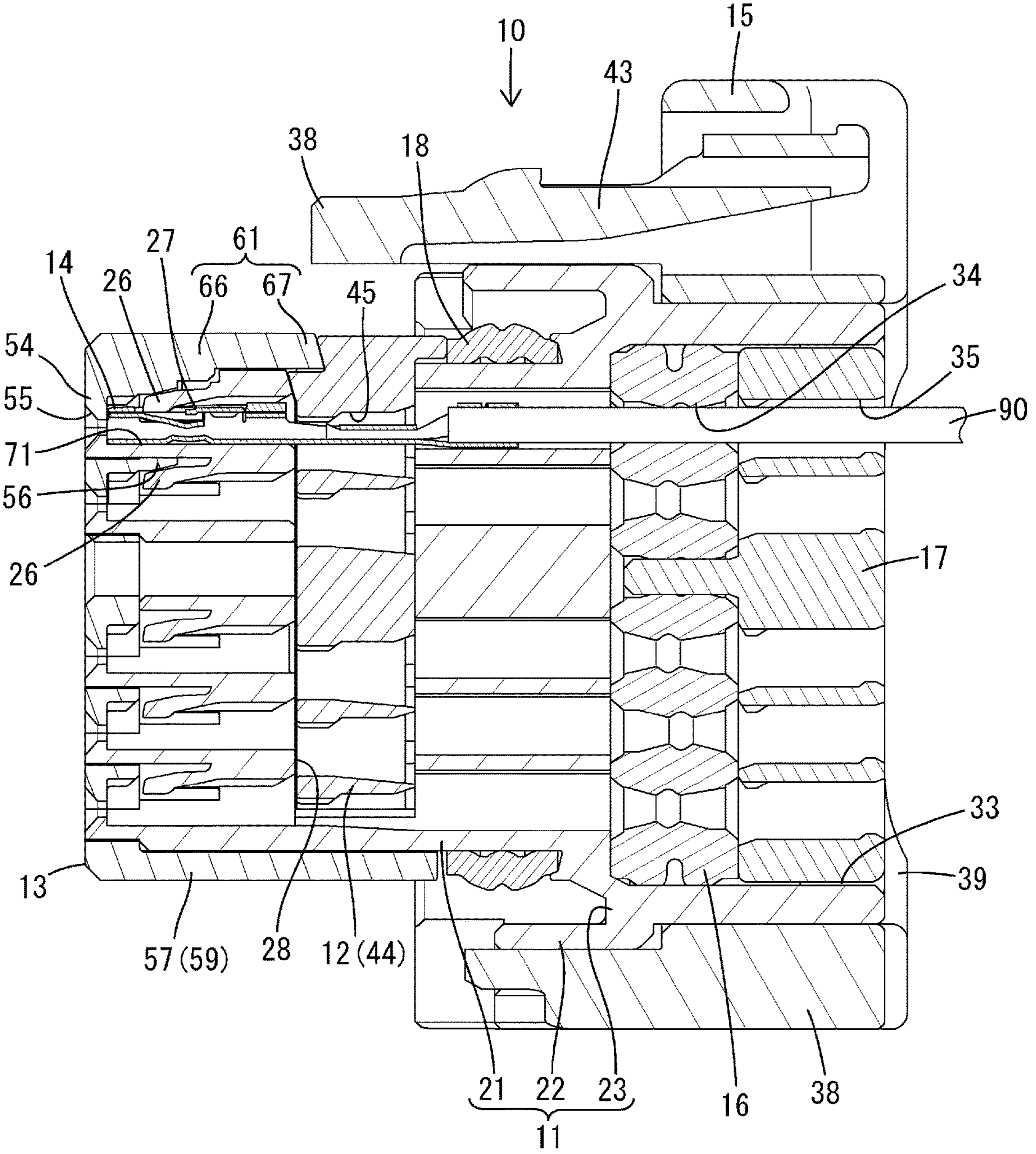
FIG. 2 is a side cross-sectional view of a connector when a retainer is at a fully locked position relative to the housing and a front member is at a mounted position.

As shown in FIG. 1, a connector 10 according to Embodiment 1 includes a housing 11, a retainer 12 and a front member 13 that are mounted to the housing 11, and a lever 15 that is pivotably supported by the housing 11. The housing 11 can be fitted to a partner connector (not shown). The retainer 12 is disposed so as to be movable between a partially locked position and a fully locked position relative to the housing 11. The front member 13 is mounted to the housing 11 from a direction (later-described forward direction) that intersects the movement direction of the retainer 12 relative to the housing 11. Furthermore, as shown in FIG. 2, the connector 10 includes a plurality of terminal fittings 14 (only one terminal fitting 14 is shown) housed in the housing 11, a collective rubber plug 16 that seals the space between electric wires 90 connected to the terminal fittings 14 and the housing 11, a rear holder 17 that restricts dislodgement of the collective rubber plug 16 from the housing 11, and a seal ring 18 that seals off the space between the partner connector and the housing 11. Note that, regarding the front-rear direction in the following description, the surface of the housing 11 that is fitted to the partner connector is on the front side. The up-down direction is based on the up-down direction in the drawings. The left-right direction is based on the left-right direction as seen from the front side of the connector 10. In Embodiment 1, the up-down direction is equivalent to the height direction, and the left-right direction is equivalent to the width direction. In FIG. 1, the front side is indicated by the X arrow, the right side is indicated by the Y arrow, and the upper side is indicated by the Z arrow. These directions do not necessarily coincide with the directions when the connector 10 is mounted in a vehicle or the like (not shown).

(Housing, Terminal Fitting, Collective Rubber Plug, Rear Holder, Seal Ring, and Lever)

Figure 8:
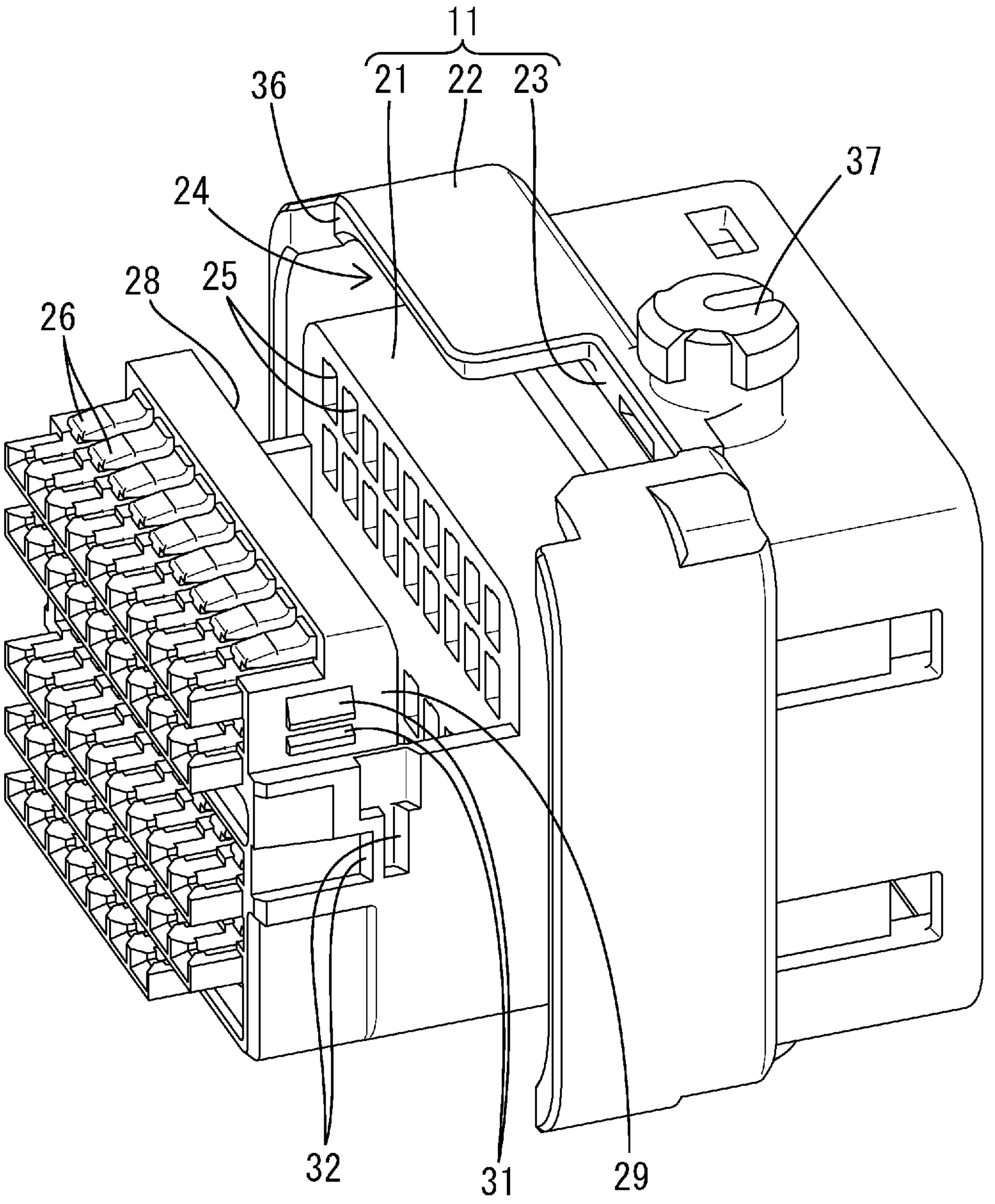
FIG. 8 is a perspective view of the housing.

The housing 11 is made of a synthetic resin, and as shown in FIG. 8, has a housing body 21, a fitting tubular portion 22 that surrounds the outer circumference of the housing body 21, and a coupling portion 23 that connects the housing body 21 and the fitting tubular portion 22 in a radial direction. The space between the housing body 21 and the fitting tubular portion 22 and open forward of the coupling portion 23 is a fitting space 24 into which a hood portion of the partner connector can be fitted.

The housing body 21 has a rectangular outer shape with four rounded corners as seen from the front, and has cavities 25 extending therethrough in the front-rear direction. The cavities 25 are arranged in rows in the left-right direction and columns in the up-down direction in the housing body 21. In the housing body 21, a lance 26 protrudes from the inner wall of each cavity 25. As shown in FIG. 8, the lances 26 are exposed to the outside before the front member 13 is mounted to the housing 11.

Figure 3:
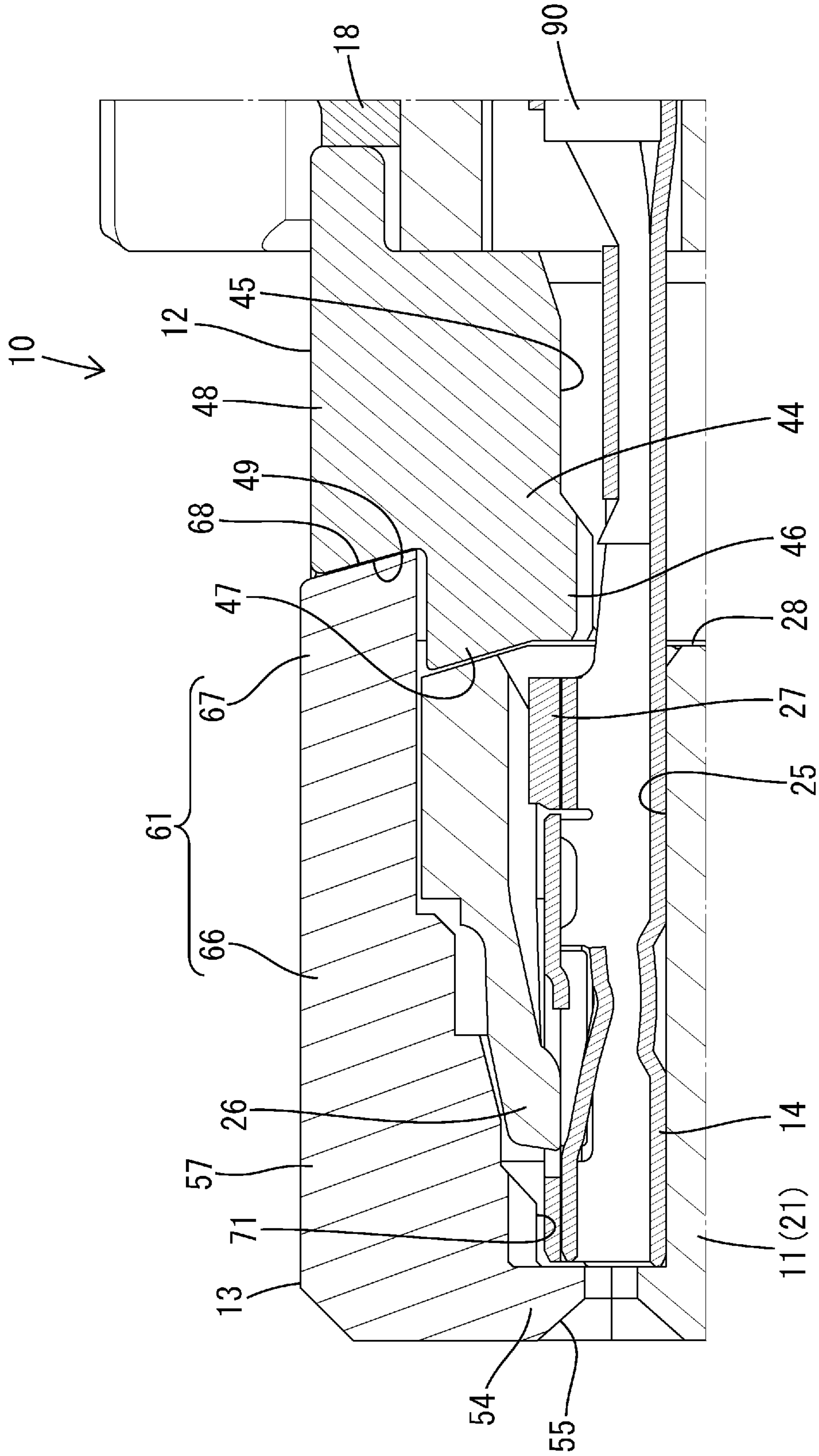
FIG. 3 is a side cross-sectional view in which a main portion of the connector shown in FIG. 2 is enlarged.

A terminal fitting 14 is inserted into a cavity 25 from the rear side, and is locked by a lance 26 so as to primarily be retained by the housing body 21. The terminal fitting 14 is made of a conductive metal, and as shown in FIGS. 2 and 3, has a tubular connection portion 27. The tab of a partner terminal fitting (not shown) is inserted into and connected to the connection portion 27. Also, the terminal fitting 14 is connected to a terminal end portion of an electric wire 90.

Figure 4:
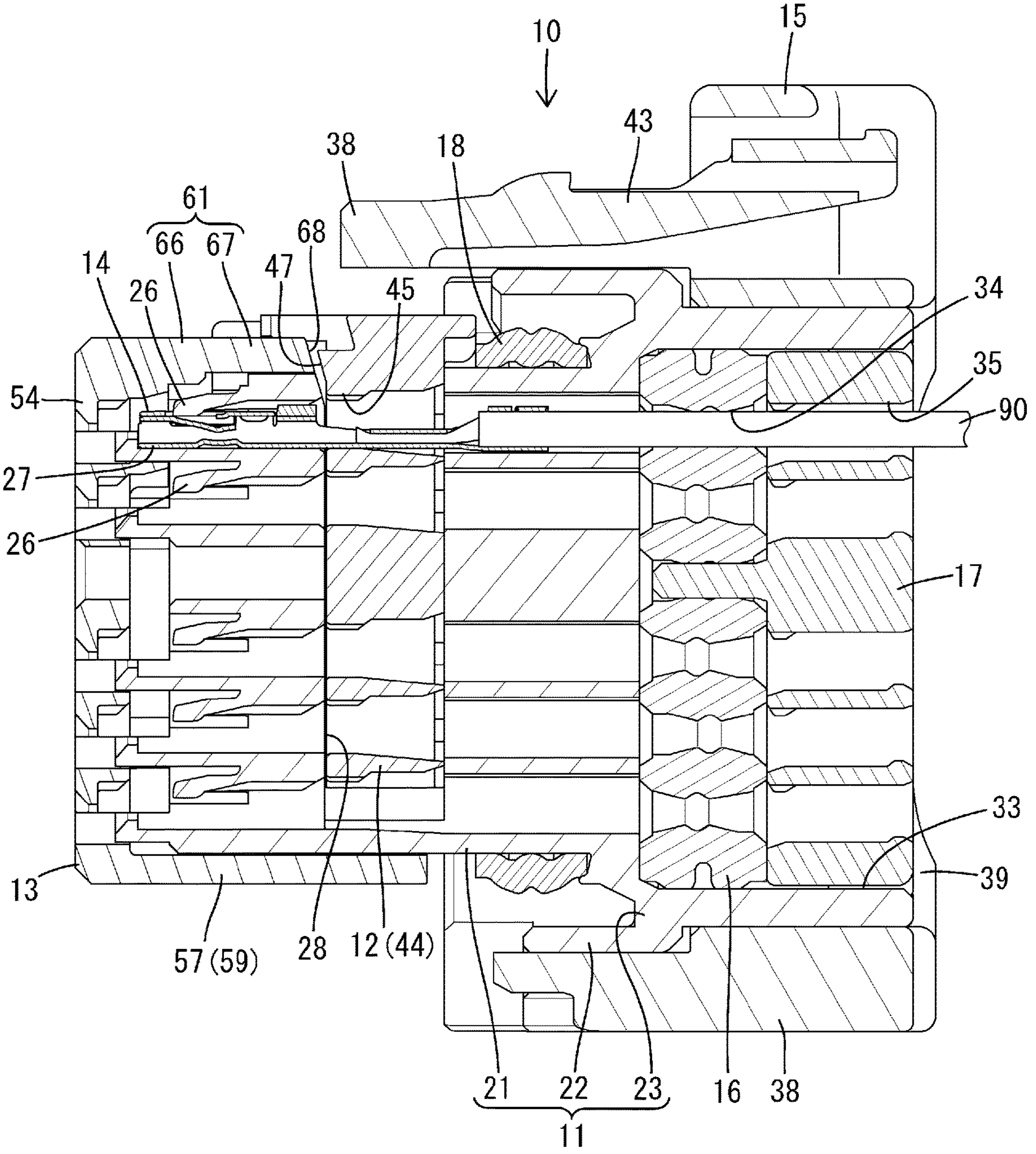
FIG. 4 is a side cross-sectional view showing the connector when the retainer is at a partially locked position relative to the housing, and movement of the front member to the mounted position is restricted.

As shown in FIG. 8, the housing body 21 has a mounting hole 28 that is open at the upper end portions of the left and right side surfaces of the upper surface of the housing body 21 (one surface), and is recessed inside the housing body 21 to a position near the bottom surface (see FIG. 4). The retainer 12 is inserted into the mounting hole 28 from above. The cavities 25 of the housing body 21 are divided between the front and rear by the mounting hole 28. The lances 26 are disposed forward of the mounting hole 28 in the housing body 21.

As shown in FIG. 8, recess surfaces 29, which are a step removed from adjacent portions, are provided at portions of the housing body 21 spanning from the upper surface to upper end portions of left and right side surfaces, at a portion of the housing body 21 forward of the mounting hole 28. The recess surfaces 29 on the left and right side surfaces of the housing body 21 are each provided with two locking protrusions 31 arranged in the up-down direction. Each locking protrusion 31 has a rib shape extending in the front-rear direction, and as described below, have a function of keeping the retainer 12 at the partially locked position and the fully locked position.

The left and right side surfaces of the housing body 21 are each provided with locking recesses 32 at portions below the locking protrusions 31. The locking recesses 32 have a groove shape extending in the up-down direction, are disposed side by side in the front-rear direction, and can be locked to later-described locking protrusions 64 of the front member 13. As shown in FIG. 2, the rear end portion of the housing body 21 is provided with a rubber plug housing recess 33. The rubber plug housing recess 33 is open in the rear surface of the housing body 21. The collective rubber plug 16 is inserted into the rubber plug housing recess 33 from the rear side.

The collective rubber plug 16 is made of a rubber such as silicone rubber and has a mat shape, and the thickness dimension thereof extends in the front-rear direction. As shown in FIG. 2, the collective rubber plug 16 has a plurality of seal holes 34 extending therethrough in the front-rear direction and into which the electric wires 90 can be inserted in a liquid-tight manner. The outer circumferential surface of the collective rubber plug 16 comes into close contact with the inner circumferential surface of the rubber plug housing recess 33. The rear holder 17 is mounted to the housing body 21 from the rear side while the collective rubber plug 16 is housed in the rubber plug housing recess 33. The rear holder 17 is made of a synthetic resin, and is housed in the rubber plug housing portion 33 following the collective rubber plug 16, and has communication holes 35 that are continuous with the seal holes 34. The collective rubber plug 16 is restricted from dislodging rearward from the housing body 21 by the rear holder 17. The electric wire 90 extending from the terminal fitting 14 passes through the communication hole 35 of the rear holder 17.

The seal ring 18 is fitted to the outer surface of the housing body 21. The seal ring 18 is made of a rubber such as silicon rubber, and has a rectangular ring shape with four rounded corners as seen from the front, though this is not shown in detail. The seal ring 18 is restricted from dislodging rearward by the coupling portion 23 while fitted to the outer surface of the housing body 21, and is restricted from dislodging forward by a later-described circumferential wall 57 of the front member 13. The seal ring 18 is held sandwiched in a liquid-tight manner between the hood portion of the partner connector and the housing body 21.

The coupling portion 23 has a shape extending outward in a radial direction from an intermediate portion (near the front end of the rubber plug housing recess 33) in the front-rear direction of the outer surface of the housing body 21. As shown in FIG. 8, the fitting tubular portion 22 has a tubular shape that protrudes forward from an outer end portion on the outer side in the radial direction of the coupling portion 23, more specifically a square tube shape whose four corners are rounded. The front end of the fitting tubular portion 22 is located rearward of the front end of the housing body 21. The front end of the upper wall of the fitting tubular portion 22 is provided with a recessed region 36 at a position opposing the rear portion of the mounting hole 28. The retainer 12 is inserted into the mounting hole 28 from above the housing 11 via the recessed region 36. A movement operation performed on the retainer 12 can be performed by, for example, pressing the retainer 12 from the recessed region 36 side. The outer surface of the housing 11 is provided with shaft portions 37 (only the upper shaft portion 37 is shown in FIG. 8) that protrude up and down from respective portions including the coupling portion 23 near the center in the left-right direction. The shaft portions 37 pivotably support the lever 15.

The lever 15 is made of a synthetic resin, and while not shown in detail, has a pair of cam plate portions 38 that face in the up-down direction, and a joining portion 39 (only partially shown) that extends in the up-down direction and is connected to the cam plate portions 38 as shown in FIG. 2, and has a gate plate shape overall. As shown in FIG. 1, the cam plate portions 38 are each disposed with plate surfaces thereof oriented in the up-down direction, and each have a cam groove 42 and a shaft receiving portion 41 that receives a shaft portion 37. The lever 15 is pivoted about the shafts 37 while the cam grooves 42 are engaged with the partner connector to advance fitting between the housing 11 and the partner connecter. The upper cam plate portion 38 is provided with a lock arm 43 that is elastically deformable to lock with the partner connector and hold the housing 11 and the partner connector in a fitted state. As shown in FIG. 2, the cam plate portions 38 are disposed along the upper and lower surfaces of the fitting tubular portion 22. A portion of the upper cam plate portion 38 is disposed so as to oppose, from above, an end portion of the retainer 12 inserted into the mounting hole 28 via the recessed region 36, and partially cover the end portion of the retainer 12.

(Retainer)

Figure 9:
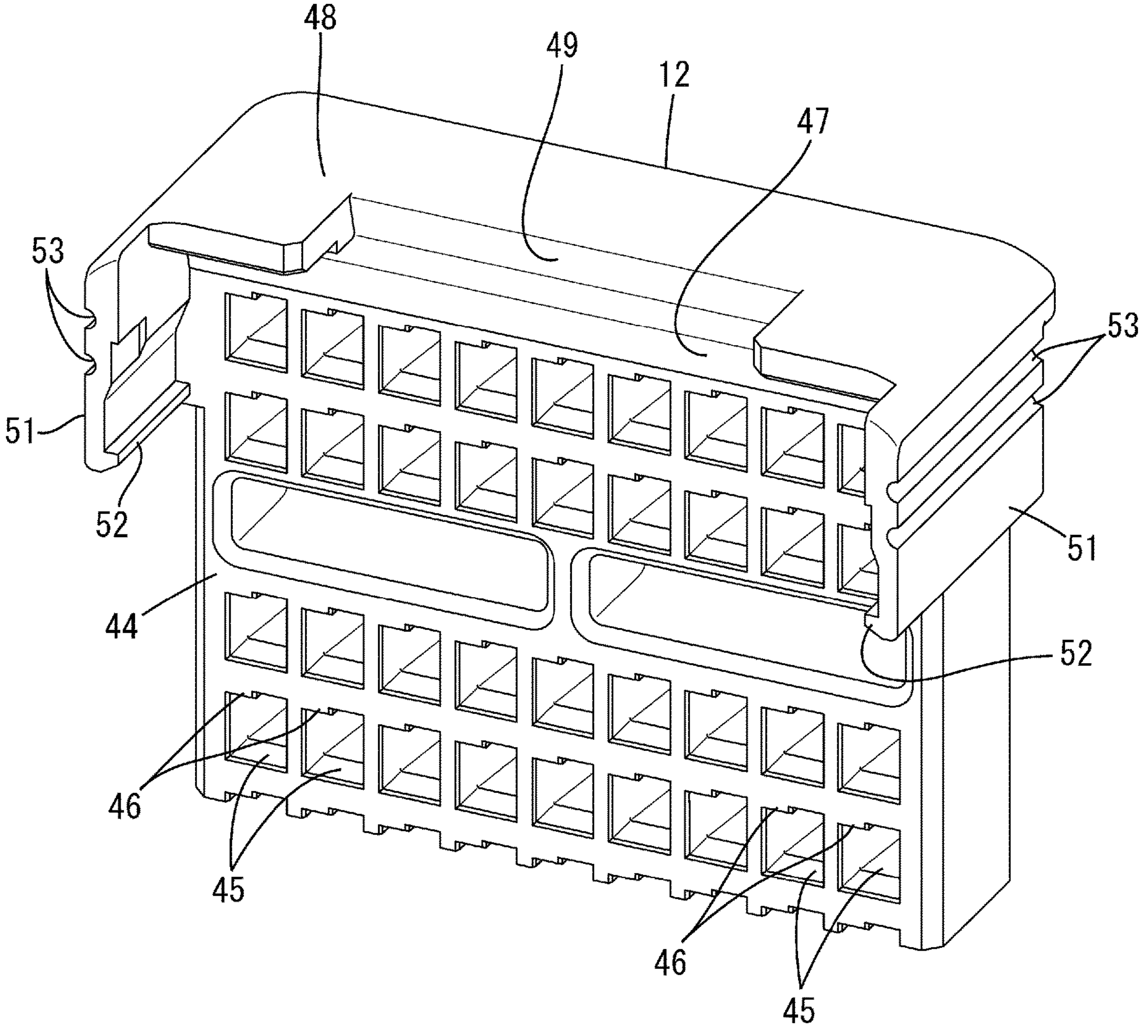
FIG. 9 is a perspective view of the retainer.
Figure 10:
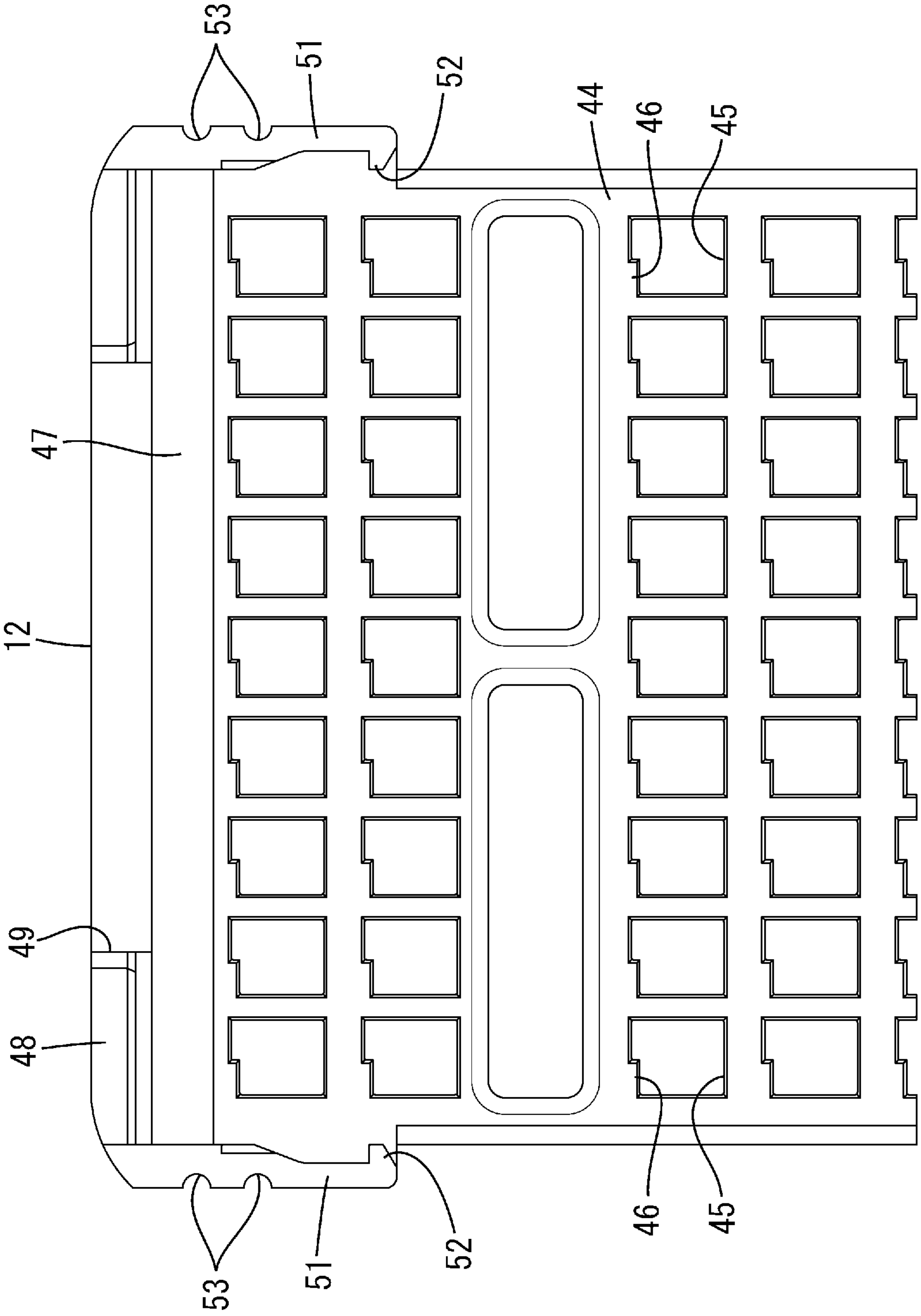
FIG. 10 is a front view of the retainer.

The retainer 12 is made of a synthetic resin, and as shown in FIGS. 9 and 10, has a retainer body 44 that has a rectangular outer shape as seen from the front. The retainer body 44 has a constant thickness in the front-rear direction (see FIG. 11), and is entirely housed in the mounting hole 28 of the housing body 21 when the retainer 12 is at the fully locked position (see FIG. 2).

As shown in FIGS. 9 and 10, the retainer body 44 has through holes 45 disposed in lines in the up-down direction and the left-right direction at positions that correspond to the cavities 25. Each of the through holes 45 have a rectangular shaped opening, and a detection portion 46 protrudes from one of the four corners thereof. The detection portion 46 does not block a path along which the terminal fitting 14 travels to allow insertion of the terminal fitting 14 to the cavity 25 when the retainer 12 is at the partially locked position (see FIG. 4). When the retainer 12 is at the fully locked position, the detection portion 46 opposes, from the rear side, the connection portion 27 of the terminal fitting 14 inserted into the cavity 25, and restricts rearward dislodgement of the terminal fitting 14 from the housing 11 (see FIG. 3).

Figure 5:
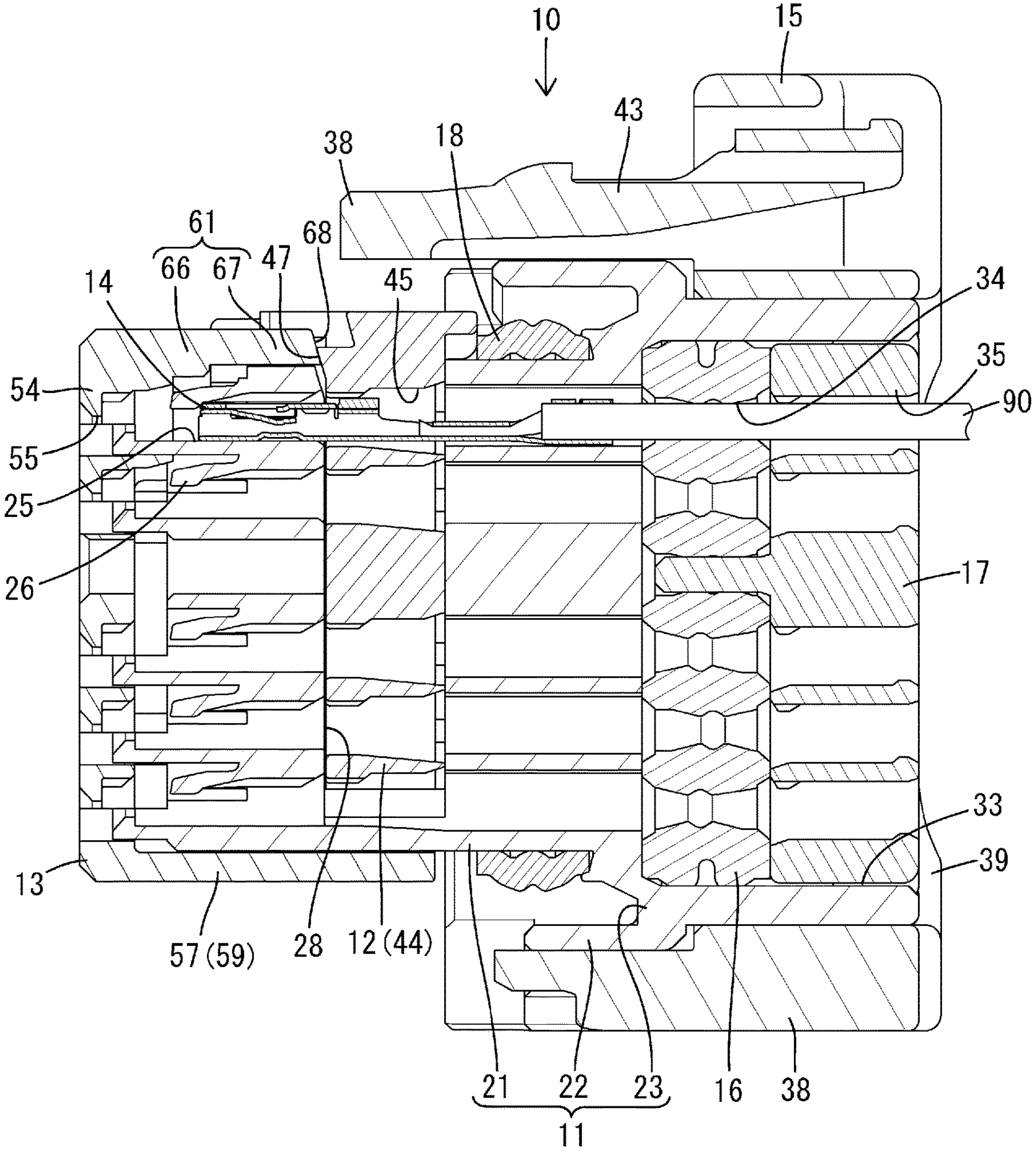
FIG. 5 is a side cross-sectional view showing the connector when the retainer is at an intermediate position relative to the housing, and movement of the front member to the mounted position is restricted.
Figure 6:
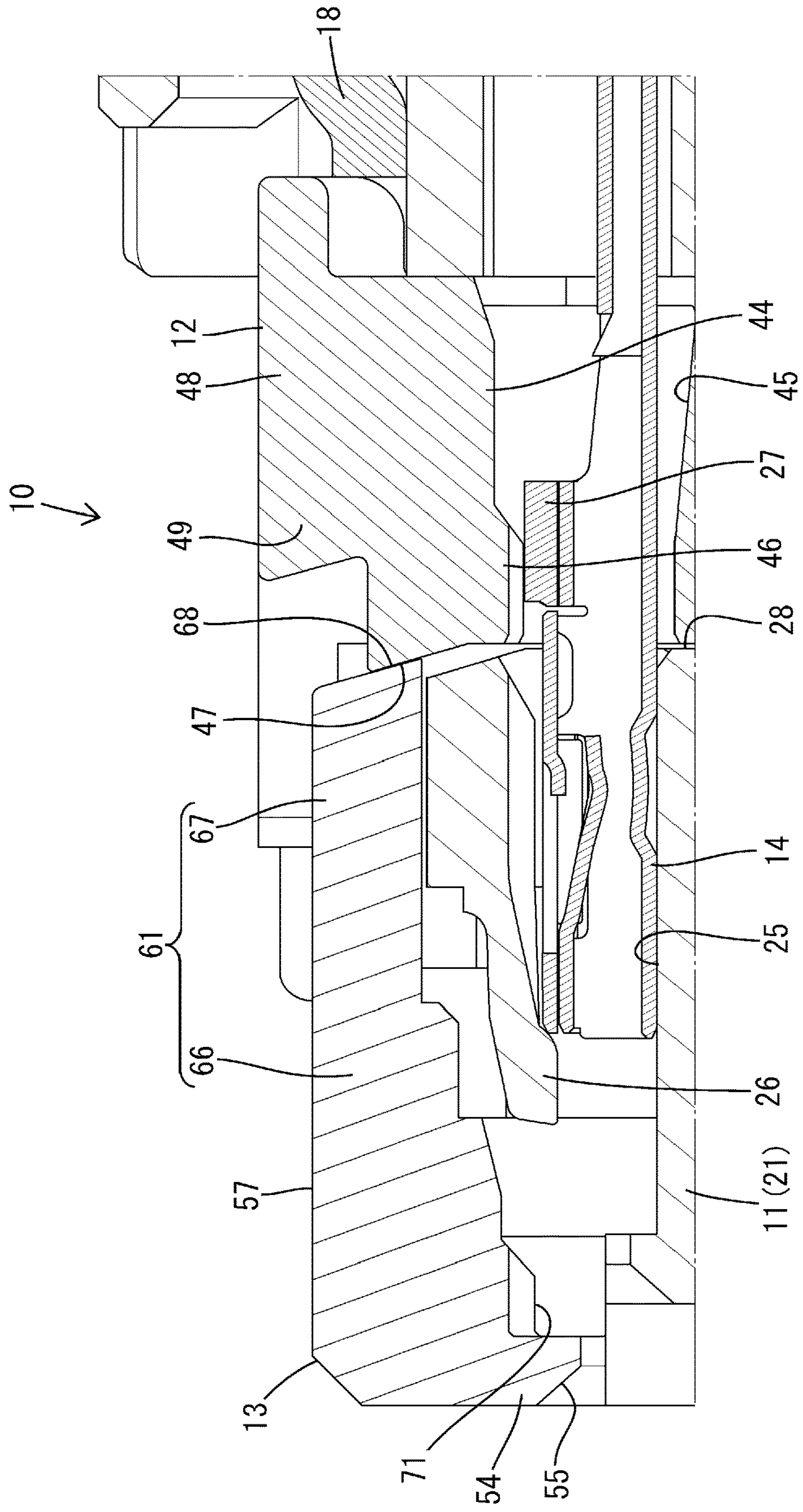
FIG. 6 is a side cross-sectional view in which a main portion shown in FIG. 5 is enlarged.

As shown in FIGS. 9 and 10, the retainer body 44 has an interference-receiving surface 47 that extends the entire width in the left-right direction of the upper end portion of the front surface thereof. The interference-receiving surface 47 of the retainer body 44 is disposed so as to be able to interfere with a later-described interference portion 61 of the front member 13 when the retainer 12 is at the partially locked position shown in FIG. 4 and when the retainer 12 is at an intermediate position along the path from the partially locked position to the fully locked position shown in FIGS. 5 and 6. The interference-receiving surface 47 is disposed above the through holes 45 in the uppermost row so as to be close to the through holes 45. As shown in FIGS. 4 to 6, the interference-receiving surface 47 is disposed inclined gradually forward while extending upward. The upper end of the interference-receiving surface 47 is located at the forefront of the retainer body 44, and is located at the upper end of the retainer body 44.

As shown in FIGS. 9 and 10, the retainer 12 has a covering portion 48 that overlaps and is coupled to the upper surface of the retainer body 44. The covering portion 48 has a plate shape and the plate surfaces thereof are disposed oriented in the up-down direction. The left and right end portions on the front side of the covering portion 48 protrude forward relative to the retainer body 44, and are disposed so as to be able to come into contact with and be supported by the recess surfaces 29 on the upper surface side of the housing body 21. The central portion in the left-right direction on the front side of the covering portion 48 is provided with an open fitting recess 49. As shown in FIG. 1, a later-described leading end interference portion 67 of the front member 13 is positionally inserted into the fitting recess 49 from the front in a fitted state.

As shown in FIGS. 9 and 10, the retainer 12 has a pair of side portions 51 that respectively protrude downward from left and right end portions of the covering portion 48. The side portions 51 each have a plate shape and are disposed with plate surfaces thereof oriented in the left-right direction. The rear side of each side portion 51 overlaps and is coupled to a side surface of the retainer body 44. The front side of each side portion 51 is disposed protruding forward relative to the retainer body 44 and facing the corresponding recess surface 29 of a side surface of the housing body 21 in a contactable manner (see FIG. 7). On the front side of each side portion 51, a rib-shaped locking portion 52 extending in the front-rear direction is provided at the lower end portion of the inner surface (the surface facing toward the center in the left-right direction). As shown with the double-dot-dash line in FIG. 7, as a result of the locking protrusion 52 being sandwiched between the locking protrusions 31, the retainer 12 remains restricted from moving in the up-down direction relative to the housing 11 when at the partially locked position. When the retainer 12 is at the partially locked position, the front side of the covering portion 48 is separated upward from the upper surface of the housing body 21, and the interference-receiving surface 47 is disposed protruding upward relative to the upper surface of the housing body 21 (see FIG. 4).

Figure 7:
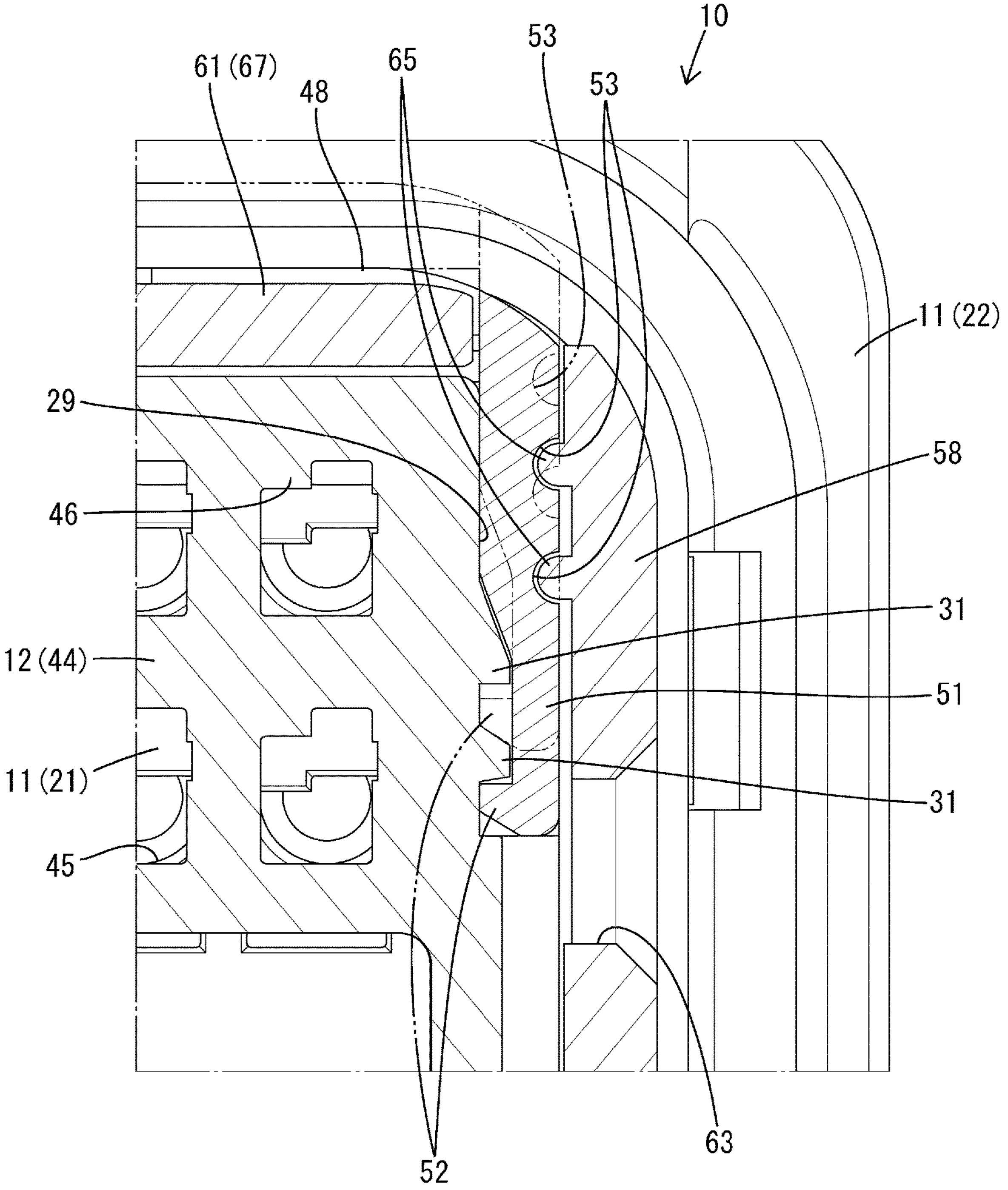
FIG. 7 is a lateral cross-sectional view in which a portion of the connector where a protrusion of the front member is fitted into a recess of the retainer is enlarged.

As shown in FIG. 7, due to the locking portion 52 opposing the lower locking protrusion 31 of the housing 11 in a contactable manner from below, the retainer 12 is kept at the fully locked position relative to the housing 11 while being restricted from moving back to the partially locked position. When the retainer 12 is at the fully locked position, the front side of the covering portion 48 is disposed so as to be able to come into contact with the upper surface of the housing body 21, and is restricted from moving further downward past the fully locked position of the retainer 12. As shown in FIG. 3, when the retainer 12 is at the fully locked position, the entire interference-receiving surface 47 is located inside the mounting hole 28.

Figure 11:
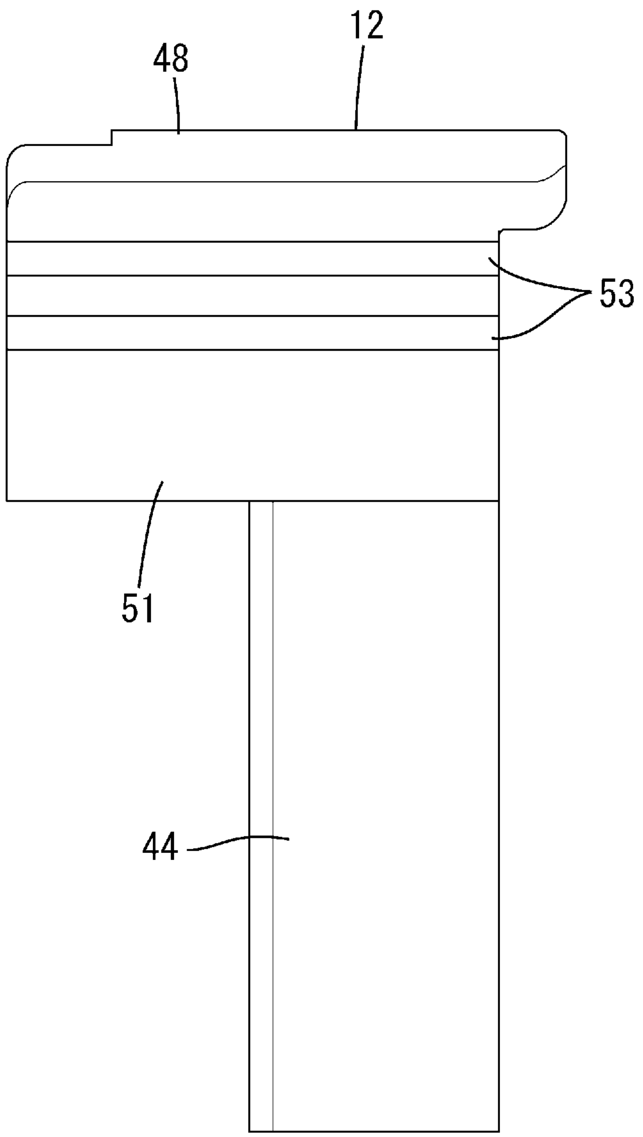
FIG. 11 is a side view of the retainer.

As shown in FIG. 10, among the side portions 51, the outer surface of one side portion 51 (the side portion 51 on the right side of FIG. 10) is provided with two recesses 53 disposed in the up-down direction. Each of the recesses 53 has an arc-shaped cross-section, more specifically a semicircular cross-section, and as shown in FIGS. 9 and 11, extends along the entire length in the front-rear direction of the outer surface of the side portion 51 while being open at the front and rear ends of the side portion 51. As shown in FIG. 7, each recess 53 is configured such that a later-described protrusion 65 of the front member 13 can be suitably inserted therein.

(Front Member)

The front member 13 is made of a synthetic resin, and is mounted to the housing body 21 from the front and held at a temporary stop position (see FIG. 13), and is further moved from the temporary stop position and held at a mounted position (see FIG. 1). The front member 13 has a front wall 54 that has a rectangular outer shape whose four corners are rounded, as seen from the front. As shown in FIGS. 2 and 3, the thickness dimension of the front wall 54 extends in the front-rear direction, and the front wall 54 is positioned on the front surface side of the housing 11 so as to cover the lances 26 from the front. The front wall 54 has a plurality of tab insertion holes 55 at positions that correspond to the cavities 25. The tab of a partner terminal fitting is inserted into the connection portion 27 of the terminal fitting 14 via a tab insertion hole 55. As shown in FIG. 2, the rear surface of the front wall 54 has retaining portions 56 that respectively protrude rearward from positions adjacent to the tab insertion holes 55. When the front member 13 is at the mounted position, each retaining portion 56 enters the bending space of a lance 26 and restricts the bending operation of the lance 26. The front wall 54 is provided with fitting recesses 71 that are in communication with the tab insertion holes 55 and, as shown in FIG. 3, receive the connection portions 27 of the terminal fittings 14.

Figure 12:
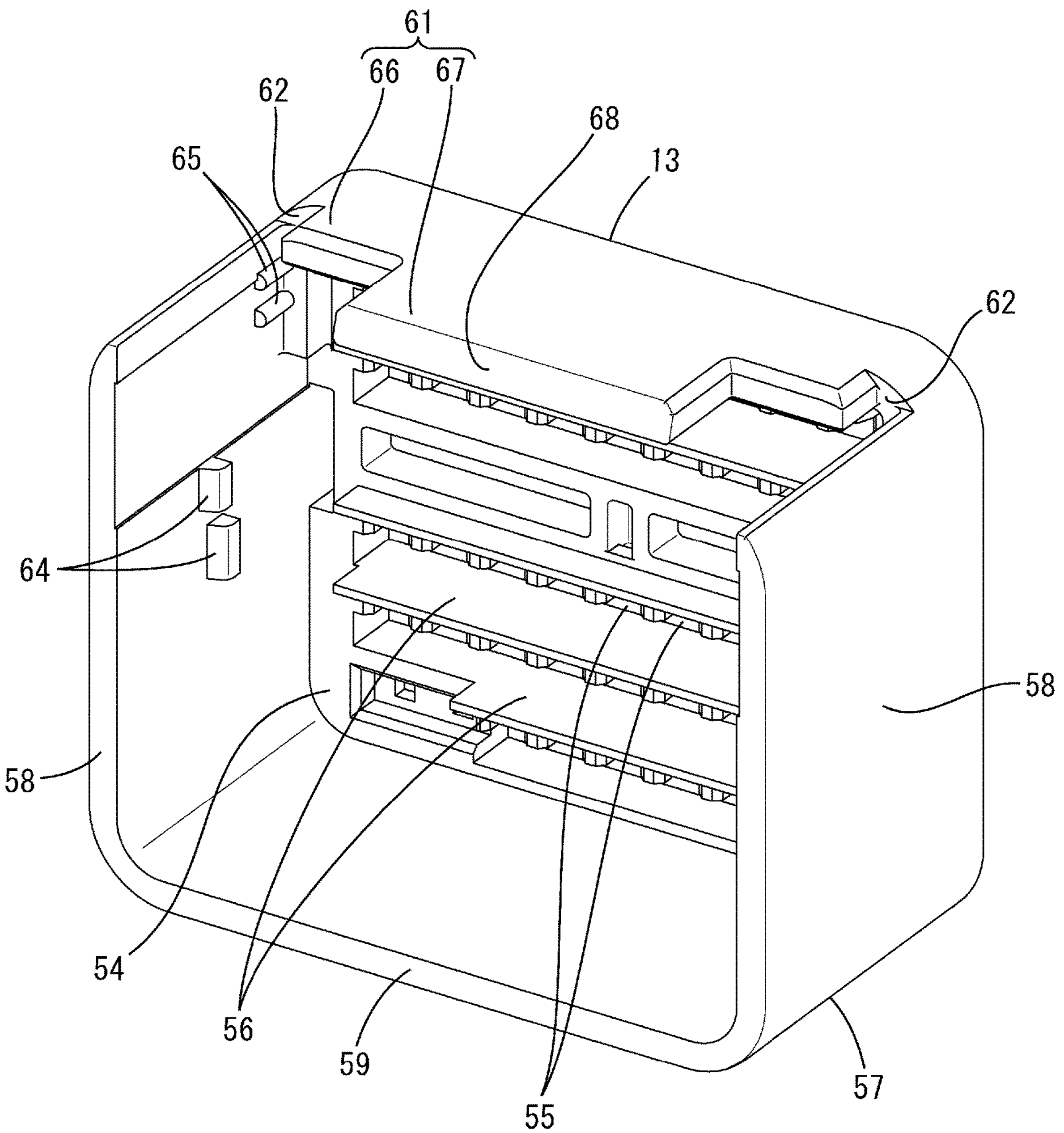
FIG. 12 is a perspective view of the front member.

As shown in FIG. 12, the front member 13 has the circumferential wall 57 that protrudes rearward from the outer end portion of the front wall 54. The circumferential wall 57 has a pair of side wall portions 58 that respectively protrude rearward from the left and right end portions of the front wall 54, a bottom wall portion 59 that protrudes rearward from the lower end portion of the front wall 54, and the interference portion 61 that protrudes rearward from the upper end portion of the front wall 54. The side wall portions 58 and the bottom wall portion 59 are integrally connected in a curved shape at two corners of the lower end of the front member 13. The side wall portions 58 and the interference portion 61 are integrally connected at two corners of the upper end of the front member 13 via cut-out portions 62.

The bottom wall portion 59 has a plate shape and is disposed with plate surfaces thereof oriented in the up-down direction. As shown in FIG. 2, the bottom wall portion 59 is disposed so as to oppose the lower surface of the housing body 21 and cover the lower surface of the housing body 21 when the front member 13 is at the mounted position.

The side wall portions 58 each have a plate shape and are disposed so that plate surfaces thereof are oriented in the left-right direction. Each side wall portion 58 is disposed so as to oppose a side surface of the housing body 21 and cover the side surface of the housing body 21 and, as shown in FIG. 7, cover the outer surface of the side portion 51 on the upper side of the retainer 12 while opposing the side portion 51, when the front member 13 is at the mounted position.

As shown in FIG. 12, the inner surface (the surface facing toward the center in the left-right direction) of each side wall portion 58 is provided with two of the locking protrusions 64 arranged in the up-down direction. Each locking protrusion 64 has a rib shape extending in the up-down direction. As a result of the side wall portions 58 elastically deforming and the locking protrusions 64 then fitting into the corresponding locking recesses 32, the front member 13 is held at the temporary stop position and the mounted position relative to the housing 11. The upper end portion on the inner surface of each side wall portion 58 is provided with two protrusions 65 arranged in the up-down direction. Each protrusion 65 has a cross-sectional arc shape, more specifically a cross-sectional semi-circular shape so as to correspond to a recess 53 (see FIG. 7), and extends in a rib shape on the inner surface of the side wall portion 58.

As shown in FIG. 12, the interference portion 61 has a plate shape and is disposed with plate surfaces thereof oriented in the up-down direction. The interference portion 61 has a base end interference portion 66 that is continuous with the upper end portion of the front wall 54, and the leading end interference portion 67 that protrudes rearward from a position near the center of the base end interference portion 66 in the left-right direction. As shown in FIGS. 2 and 3, the base end interference portion 66 is disposed so as to oppose the upper surface of the housing body 21 in a contactable manner and cover the upper surface of the housing body 21, when the front member 13 is at the mounted position. When the front member 13 is at the mounted position, the base end interference portion 66 is located above the uppermost lances 26, and restricts a bending operation of the lances 26.

As shown in FIGS. 2 and 3, the rear end portion of the leading end interference portion 67 is disposed so as to oppose the upper surface of the retainer body 44 in a contactable manner and cover the upper surface of the retainer body 44, when the retainer 13 is at the mounted position. As shown in FIG. 12, the leading end interference portion 67 is narrower than the base end interference portion 66. As shown in FIG. 1, the leading end interference portion 67 is shaped so as to be fittable to the fitting recess 49 of the retainer 12. As shown in FIG. 12, the rear end surface of the leading end interference portion 67 is an interference surface 68 that extends linearly along the left-right direction. The interference surface 68 is disposed along the up-down direction. As shown in FIGS. 4 to 6, the interference surface 68 can abut against and interfere with the interference-receiving surface 47 when the retainer 12 is at the partially locked position or the later-described intermediate position. As shown in FIG. 3, the interference surface 68 is disposed facing the rearmost wall surface of the fitting recess 49 on the inner side of the fitting recess 49 when the retainer 12 is at the fully locked position.

(Operation of Connector)

The retainer 12 is inserted into the mounting hole 28 from above and kept at the partially locked position, and in this state, the terminal fitting 14 is inserted into the cavity 25 from the rear side. Next, the upper surface of the covering portion 48 is pressed, and the locking portions 52 move over the lower locking protrusions 31, and the retainer 12 is moved toward the fully locked position.

When the terminal fitting 14 is properly inserted into the cavity 25, the detection portion 46 is disposed so as to be lockable to the rear end of the connection portion 27, and thus rearward dislodgement of the terminal fitting 14 is restricted. At this time, the upper surface of the retainer body 44 is lower than the upper surface of the front member 13, and the fitting recess 49 of the covering portion 48 is open forward at a position higher than the upper surface of the housing body 21.

Figure 13:
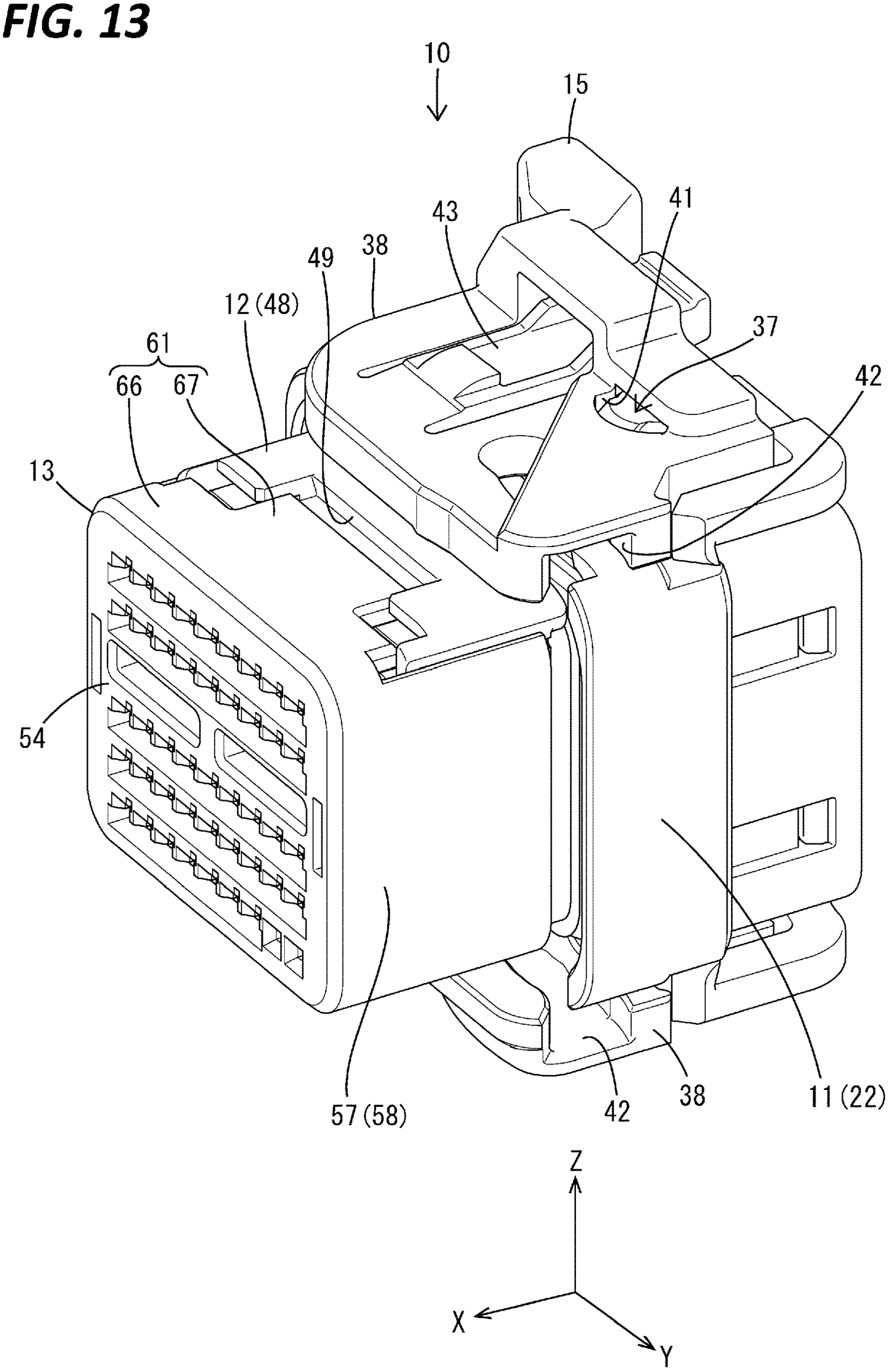
FIG. 13 is a perspective view of the connector when the front member is at a temporary stop position.

During an operation to move the retainer 12 to the fully locked position, the locking protrusions 64 fit into the locking recesses 32, and the front member 13 is held at the temporary stop position relative to the housing 11. As shown in FIG. 13, the front member 13, when at the temporary stop position, is disposed with the front wall 54 located forward of the housing 11 and the leading end interference portion 67 located forward of the rear wall surface of the fitting recess 49. Once the operation of moving the retainer 12 to the fully locked position has been performed, the front member 13 is pressed rearward relative to the housing 11 from the temporary stop position to the mounted position.

When the retainer 12 is being moved to the fully locked position relative to the housing 11, the leading end interference portion 67 can be inserted in a state of being fitted into the fitting recess 49 while extending along the upper surface of the housing body 21, and the front member 13 can reach the mounted position. Here, the front member 13 is held at the mounted position relative to the housing 11 with the locking protrusions 64 being fitted into and locked to the rear locking recesses 32 (see FIG. 1). As shown in FIG. 2, when the front member 13 reaches the mounted position, a front surface portion of the housing 11 is closed off with the tab insertion holes 55 exposed. As a result of the retaining portions 56 restricting the bending operation of the lances 26, dislodgement of the terminal fittings 14 is also restricted.

When the retainer 12 is at the partially locked position shown in FIG. 4 relative to the housing 11, or when the retainer 12 is at the intermediate position along the path from the partially locked position to the fully locked position as shown in FIGS. 5 and 6, the interference-receiving surface 47 is separated from the upper surface of the housing body 21 and protrudes on the movement path of the front member 13, and thus the interference surface 68 of the leading end interference portion 67 abuts against the interference-receiving surface 47, which restricts movement of the front member 13 to the mounted position.

As shown in FIG. 6, for example, when the terminal fitting 14 remains at the semi-inserted position and is not properly inserted into the cavity 25, the detection portion 46 interferes with the upper surface of the connection portion 27 of the terminal fitting 14, and the retainer 12 is kept at the intermediate position relative to the housing 11. At this time, as a result of the upper portion of the interference-receiving surface 47 being exposed separated from the upper surface of the housing body 21 and the interference surface 68 of the leading end interference portion 67 abutting against the exposed upper portion of the interference-receiving surface 47, movement of the front member 13 to the mounted position is restricted.

In the case of Embodiment 1, the interference-receiving surface 47 is inclined downward while extending forward so as to be able to come into firm contact with the interference surface 68, and thus the front member 13 can be reliably stopped at a position where the interference-receiving surface 47 is interfering with (in contact with) the interference surface 68. Also, when the retainer 12 is at the partially locked position or the intermediate position, the protrusions 65 abut against the front ends of the side portions 51 without fitting into the recess 53 (see the double-dot-dash line in FIG. 7). Accordingly, movement of the front member 13 to the mounted position can also be stopped at left and right side end portions of the connector 10.

When the operation of moving the front member 13 to the mounted position is restricted as described above, the locking protrusions 64 are not locked to the locking recesses 32. In this way, when the front member 13 is not at the mounted position, a state is entered where the front wall 54 is separated from the front side of the housing 11 (see FIGS. 4 and 5), and for example, the locking protrusions 64 are in contact with side surfaces of the housing body 21 and the side wall portions 58 are elastically deformed outward to the left and right sides. Then, the fitting space 24 is partially closed off, and the following fitting between the partner connector and the housing 11 is restricted. Accordingly, it is possible to detect that the retainer 12 has not reached the fully locked position.

With the above, when it is confirmed that the retainer 12 has not reached the fully locked position, another operation is performed to press the retainer 12 to the fully locked position. Here, if the terminal fitting 14 is properly inserted into the cavity 25, the retainer 12 reaching the fully locked position will result in the terminal fitting 14 being retained by the retainer 12 as well as enabling the front member 13 to be moved to the mounted position. In contrast to this, if the retainer 12 does not reach the fully locked position, it can be determined that the terminal fitting 14 is not properly inserted into the cavity 25 and remains at the semi-inserted position.

As described above, with the present Embodiment 1, using the fact that the front member 13 cannot reach the mounted position, it is possible to detect that the retainer 12 remains at the partially locked position (see FIG. 4) or the intermediate position (see FIG. 5 or 6). By performing an operation to move the retainer 12 to the fully locked position after detecting that the retainer 12 remains at the partially locked position or the intermediate position, it is possible to detect the insertion state of the terminal fitting 14. In particular, with the configuration of the present Embodiment 1, the interference portion 61 can interfere with the retainer 12 at the partially locked position or the intermediate position at a position closer than the partner connector, and thus it is possible to reliably detect that the retainer 12 is held at the partially locked position or the intermediate position.

If the retainer 12 remains at the partially locked position or the intermediate position, the interference portion 61 disposed along the upper surface of the housing body 21 interferes with the interference-receiving surface 47 protruding from the upper surface of the housing body 21, and thus a state can be realized where the interference portion 61 interferes with the interference-receiving surface 47, even if the protrusion amount of the interference-receiving surface 47 from the upper surface of the housing body 21 is small.

Furthermore, when the retainer 12 remains at the partially locked position or the intermediate position, the reverse tapered shape of the interference-receiving surface 47 allows for the interference-receiving surface 47 to firmly interfere with the interference portion 61, and thus movement of the front member 13 to the mounted position can be reliably stopped.

Furthermore, when the retainer 12 remains at the partially locked position or the intermediate position, the interference portion 61 and the interference-receiving surface 47 interfere with other each on the upper surface side of the housing body 21 and the protrusion 65 interfere with the front ends of the side portions 51 on the side surface sides of the housing body 21, and thus movement of the front member 13 to the mounted position can be stopped with greater probability.

In the case of the present Embodiment 1, the interference-receiving surface 47 does not move over the interference portion 61 of the front member 13 and interfere with the hood portion of the partner connector, but instead interferes with the interference portion 61 adjacent to the upper surface of the housing body 21, and thus the protrusion amount of the interference-receiving surface 47 can be suppressed. As a result, the opposing distance between end portions of the retainer 12 and each of the cam plate portions 38 of the lever 15 can be reduced, which contributes to a reduction in the size of the connector 10. Naturally, the present disclosure is not limited to a small connector 10.

Other Embodiments of Present Disclosure

The thus disclosed Embodiment 1 is illustrative in all aspects and is not to be construed as being limiting.

In the case of Embodiment 1, when the retainer is at the partially locked position or the intermediate position relative to the housing, the interference portion is exposed to the outside of the housing. In contrast to this, with another embodiment, when the retainer is at the partially locked position or the intermediate position relative to the housing, the interference portion may be disposed inside the housing. In this case, it is sufficient to employ a configuration where the interference portion of the front member moves into the housing and interferes with the retainer, and movement of the front member to the mounted position relative to the housing is restricted.

In the case of Embodiment 1, the front member has retaining portions that enter a bending space of the lances and restrict a bending operation of the lances when the front member is at the mounted position. In contrast to this, with another embodiment, the front member does not necessarily need to have a retaining portion that enters a bending space of a lance when at the mounted position.

In the case of Embodiment 1, side portions of the retainer are provided with recesses, and the side wall portions of the front member are provided with protrusions shaped so as to be able to be fitted into the recesses. In contrast to this, with another embodiment, a configuration may be employed where a side wall portion of the front member is provided with a recess, and a side portion of the retainer is provided with a protrusion shaped so as to be able to be fitted into the recess.

In the case of Embodiment 1, the front member is disposed so as to be able to move from the temporary stop position to the mounted position relative to the housing. In contrast to this, with another embodiment, a configuration may be employed where the front member can be moved once to the mounted position relative to the housing without passing through a temporary stop position.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector comprising:

a terminal fitting;

a housing configured to house the terminal fitting;

a retainer disposed so as to be moveable between a partially locked position and a fully locked position relative to the housing, and configured to lock the terminal fitting housed in the housing and restrict rearward dislodgement of the terminal fitting when at the fully locked position; and a front member configured to move in a direction that intersects a movement direction of the retainer with respect to the housing, and to position a front wall of the front member on a front surface side of the housing while disposed at a mounted position relative to the housing, wherein the front member has an interference portion configured to interfere with the retainer at the partially locked position or an intermediate position along a path from the partially locked position to the fully locked position when the front member moves toward the mounted position.

2. The connector according to claim 1, wherein the housing has a mounting hole that is open in at least one surface of an outer surface of the housing, the retainer is disposed inside the mounting hole and locks the terminal fitting, and the interference portion protrudes rearward from the front wall and is disposed along the one surface, and the retainer has an interference-receiving surface that is configured to protrude from the one surface and interfere with the interference portion when the retainer is at the partially locked position or the intermediate position.

3. The connector according to claim 2, wherein the interference-receiving surface is inclined forward as a leading end of the interference-receiving surface protrudes in a protruding direction from the one surface.

4. The connector according to claim 2, wherein the retainer has side portions that respectively oppose side surfaces on both sides of the outer surface of the housing that intersect the one surface, the front member has side wall portions respectively disposed outside the side portions when the front member is at the mounted position, and an outer surface of the side portions or an inner surface of the side wall portions has a recess, and the other of the outer surface and the inner surface has a protrusion that fits into the recess when the retainer is at the fully locked position and that interferes with a portion other than the recess when the retainer is at the partially locked position or the intermediate position.

5. The connector according to claim 2, further comprising a lever pivotably supported by the housing, and an end portion of the retainer is disposed so as to be exposed above the one surface and be covered by the lever at a position opposing the lever.

* * * * *